United States Patent [19]
Laub et al.

[11] 3,790,738
[45] Feb. 5, 1974

[54] PULSED HEAT EUTECTIC BONDER

[75] Inventors: Joseph L. Laub, Claremont; Derek Jenkins Griffiths, Arcadia, both of Calif.

[73] Assignee: Unitek Corporation, Monrovia, Calif.

[22] Filed: May 30, 1972

[21] Appl. No.: 257,782

[52] U.S. Cl. ........................ 219/85, 219/128, 228/1, 29/470
[51] Int. Cl. ........................ B23k 1/02
[58] Field of Search ..... 219/85, 128; 29/470, 470.3, 29/497.5; 228/1; 310/30, 15

[56] References Cited

UNITED STATES PATENTS

| | | | |
|---|---|---|---|
| 3,051,826 | 8/1962 | Avila | 219/85 X |
| 3,477,119 | 11/1969 | Smith | 219/128 X |
| 3,448,307 | 6/1969 | Duris | 310/30 X |
| 3,462,666 | 8/1969 | Martinek | 310/30 X |
| 3,515,840 | 6/1970 | Dix | 219/85 |
| 3,400,448 | 9/1968 | Helda et al. | 29/497.5 X |
| 3,357,090 | 12/1967 | Tiffany | 29/470 |

*Primary Examiner*—C. L. Albritton
*Attorney, Agent, or Firm*—Christie, Parker & Hale

[57] ABSTRACT

A pulsed heat hybrid semiconductor die bonding apparatus utilizing a pair of heating electrodes which bracket a die collet and contact the substrate area immediately adjacent each side of the die or chip to be bonded. A heating pulse of a predetermined magnitude and duration produces localized substrate heating via a discharge of current to the metalization under the chip. A conductivity monitor connected to the electrodes indicates the quality of the electrical contact of the heating electrodes with the substrate. Simultaneous with the substrate heating current pulse, a low frequency, unidirectional mechanical scrubbing motion is applied to the arm holding the die collet. The arm is supported in the apparatus by means of a flexure type of mounting. The combination of heating current applied to the substrate in pulses with scrubbing action precisely controls the heating and eutectic bonding of the substrate and chip, preventing subsequent unbonding or heat damage to the semiconductor die. The bonding arm mechanism accepts quickly interchangeable, floating die collet tools.

14 Claims, 10 Drawing Figures

PATENTED FEB 5 1974 3,790,738

SHEET 5 OF 7

PULSED HEAT EUTECTIC BONDER

DESCRIPTION OF THE PRIOR ART

In the manufacture of integrated circuit packages a typical apparatus by which semiconductor integrated circuit dies and chips are attached to a hybrid substrate is a eutectic die bonder. Conventional operation of such a bonder entails mounting the substrate on a heater stage. Heat is applied to raise the temperature of the entire substrate, including the gold metalization deposited on the area to which the device is to be attached, to the desired eutectic temperature of the metalized area. Such temperatures typically are on the order of 300° C. Adjacent to the heater stage is a die pickup stage on which the chips to be attached to the substrate are stored. A bonding arm which supports a die pickup and bonding tool called a die collet is laterally or rotatably moved between the die pickup stage and the substrate. After the die to be attached has been picked up by the collet, the bonding tool is brought into the general area directly above the substrate. Precise alignment of the die collet with the location to which the die is to be attached is achieved by small amplitude X - Y manipulations of the heater stage or bonding arm while viewing the substrate area through a microscope or other magnifying apparatus. In this manner the die is brought directly over the precise position to which it is to be attached. Once aligned, the bonding tool is lowered to the substrate and the die is caused to bear against the substrate under a small amount of pressure exerted by the bonding arm on the bonding tool. Thereafter, a motor-driven or ultrasonically driven scrubbing action is imparted to the bonding tool for a preset amount of time.

The scrubbing action at the interface between the substrate and the back of the die, plus the general heating of the substrate, raises the interface to the temperature temeprature of the materials comprising the substrate metalization and the semiconductor chip, producing a eutectic bond.

Such conventional eutectic die bonders are subject to several significant problems, problems which have become even more acute as the sophistication of hybrid circuits has increased. Hybrid substrates are extremely heat sensitive and the possibility of causing damage to the substrate or other chips already attached to the substrate due to a general heating of the entire substrate is quite high. In addition, bonds performed by conventional bonders are subject to subsequent unbonding due to an unsatisfactory or weak eutectic bond. Such incomplete bonds are frequently due to the desire to maintain the temperature of the substrate as low as possible so as not to cause damage while at the same time achieving a satisfactory bond. The result is that a true eutectic temperature is not reached. This tendency of previously bonded devices to unbond is referred to as "die float."

As indicated above, the scrubbing action is achieved in one of several ways. In some cases a motor is connected by means of a cam and cam follower linkage to the bonding arm. This is both expensive and cumbersome, particularly when it is desired to change the amplitude of motion as semiconductor device sizes change. In addition, due to inertial considerations, effective scrubbing speed is limited. Other types of drives are utilized, such as buzzer-type and ultrasonic agitators, but are of limited value due to the lack of control over the amplitude and operating speed and the inability to achieve the relatively large amplitudes required when attaching large devices.

SUMMARY OF THE PRESENT INVENTION

The present invention avoids the foregoing problems by the provision of a pulse heated hybrid eutectic die bonding apparatus which is used for attaching semiconductor chips to a metalized substrate of material. The apparatus comprises a pickup and bonding tool, a holder for the tool, electrode means supported adjacent the bonding tool for contacting and supplying heating current to the substrate in the area adjacent the chip attachment location. Electric power supply means are provided, together with means of interconnecting the power supply and the electrodes for supplying an electric current heating pulse to the electrodes to raise the substrate area to a eutectic bonding temperature. Solenoid means are coupled to the holder for vibrating the tool at a predetermined frequency during the heating of the substrate and control means are provided for producing the pulse and vibration simultaneously for a predetermined length of time.

The present invention avoids the problems inherent in prior art die bonding apparatus by providing an apparatus which is capable of the discrete application of a precisely controlled electric current pulse with an acceptable current density to the substrate metalization to achieve a limited and localized heating of the area immediately surrounding the chip interface. At the same time that a pulse of heating current is applied to the substrate through the electrodes, the bonding tool is driven by a solenoid-permanent magnet combination with a unidirectional back-and-forth scrubbing action to achieve a reliable eutectic bond. By utilizing the apparatus of the present invention, significantly reduced substrate temperatures are possible, while precise control of time, temperature, and scrubbing enables accomplishing optimum eutectic bonding conditions.

In one embodiment the bonder is equipped with a pair of heating electrodes supported by the bonding arm and bracketing the pickup and bonding tool. The amount of bonding force applied to the chip as it bears against the substrate is controlled by means of a properly weighted, drop-in die collet which is quickly interchangeable as bonding parameters such as chip size change. This feature permits rapid substitution of the bonding weight and die collet to correspond to the size of die to be bonded.

A conductivity monitor connected to the electrodes provides an audible signal to the operator at the time when the heating electrodes are brought into contact with the substrate to verify for the operator that the electrodes are making a good electrical contact with the substrate. A poor contact could result in the application of excessive heating current pulses to the electrodes and the substrate and heat damage, burning out the chip or causing significant change in the electrical characteristics of the substrate.

Other aspects of the present invention include control of all process variables, heating current pulses, linear vibration amplitude, time duration of pulsing and scrubbing, additional bonding tool heat where required, and a constant voltage power supply to provide inherent compensation for variations in the width and thickness of substrate metalization. Drop-in heated die collets with individual weights are changeable to accommodate a broad range of die sizes. The pickup and bonding locations are mounted on a controlled air bearing cushion to permit X - Y - $\theta$ manipulation and precise, controlled alignment of the chip location with the pickup and bonding tool prior to bonding. Finally, the apparatus is easily converted to conventional hybrid eutectic bonding by removal of the heating electrodes.

DESCRIPTION OF THE DRAWING

These and other advantages of the present invention will be better understood by reference to the drawing wherein.

DESCRIPTION OF THE SPECIFIC EMBODIMENT

Figure 1:
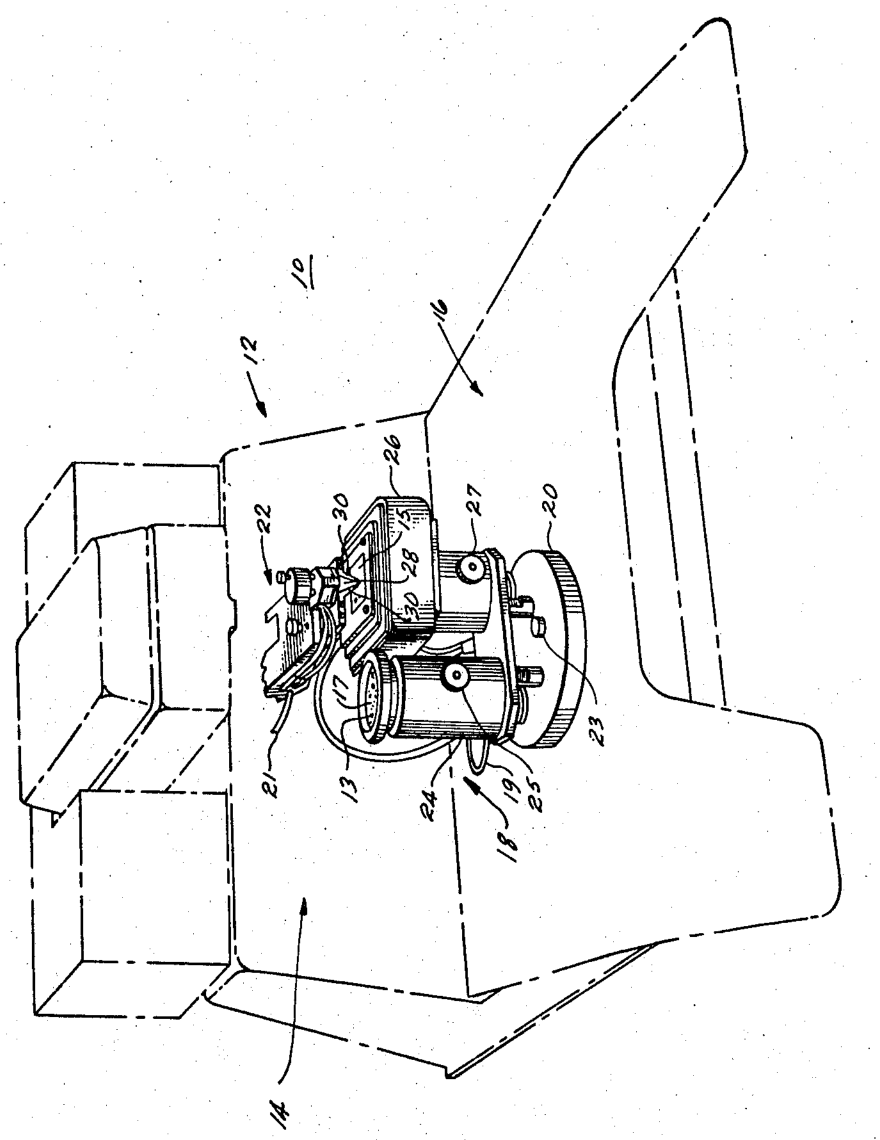
FIG. 1 is a perspective view of a bonding apparatus according to the present invention.

A die bonder apparatus 10 according to the present invention is shown in FIG. 1. The bonder comprises a bonder housing 12, an instrument control panel 14, a base assembly 16 (shown in ghosted outline), a die pickup and heater assembly 18, and a bonding arm assembly 22 (partial view). The die pickup and heater assembly 18 includes a manipulator platform 20 which is connected by means of an air line 19 to an air supply external to the bonder to provide an air bearing for the manipulator 20 when the operator moves assembly 18 relative to a bonding arm assembly 22 during the die pickup and bonding operations performed with apparatus 10. Assembly 18 includes a die pickup and storage stage 24 and a heater stage 26. A light source and magnifying optics such as a binocular microscope (not shown) are also mounted at the front of the bonder and above the bonding arm assembly to enable the operator to work on the miniature components and microcircuits such as the dies and hybrid circuit substrates which are assembled by means of the apparatus of the present invention. Control button 23 on manipulator 20 actuates the air bearing. Individual height adjustment of the pickup stages and heater stage is accomplished by means of knurled discs 25, 27 respectively.

In operation of the apparatus, semiconductor dies or chips are placed on a silvered surface 17 located at the top of die pickup stage 24. The manipulator 20, cushioned on its air bearing, is positioned by means of the apparatus optics such that the die stage is located beneath a pickup and bonding tool 28 which is mounted at the end of assembly 22. When alignment of a specific die or chip 13 with bonding tool 28 is accomplished, the air bearing is released and an apparatus control such as a foot pedal (not shown) is operated, causing tool 28 to descend, contact, and by means of vacuum supplied by another line 21 connected to the external source, secure and hold the desired die.

The bonding tool then returns to its normal elevation, the manipulator air bearing is actuated, and assembly 18 is moved again, until, by visual sighting through the apparatus optics, the heater stage 26 and the desired pad or metalized substrate area on a hybrid circuit board 15 is brought into alignment directly beneath the pickup and bonding tool 28. Again, after release of the air bearing, by operation of the control foot pedal, the pickup and bonding tool is caused to descend toward circuit board 15, until the chip 13 is physically in contact with the board. The pickup and hold vacuum is released. Localized heat is then applied to the substrate by means of heating electrodes 30 which bracket tool 28, and a longitudinal vibratory or "scrubbing" motion is applied to the pickup and bonding tool arm 32 (FIG. 5) to achieve a eutectic bond of the die to the substrate. At the completion of the bonding operation the bonding arm is raised to its normal rest position and the bond cycle is ready to be begun again.

Figure 2:
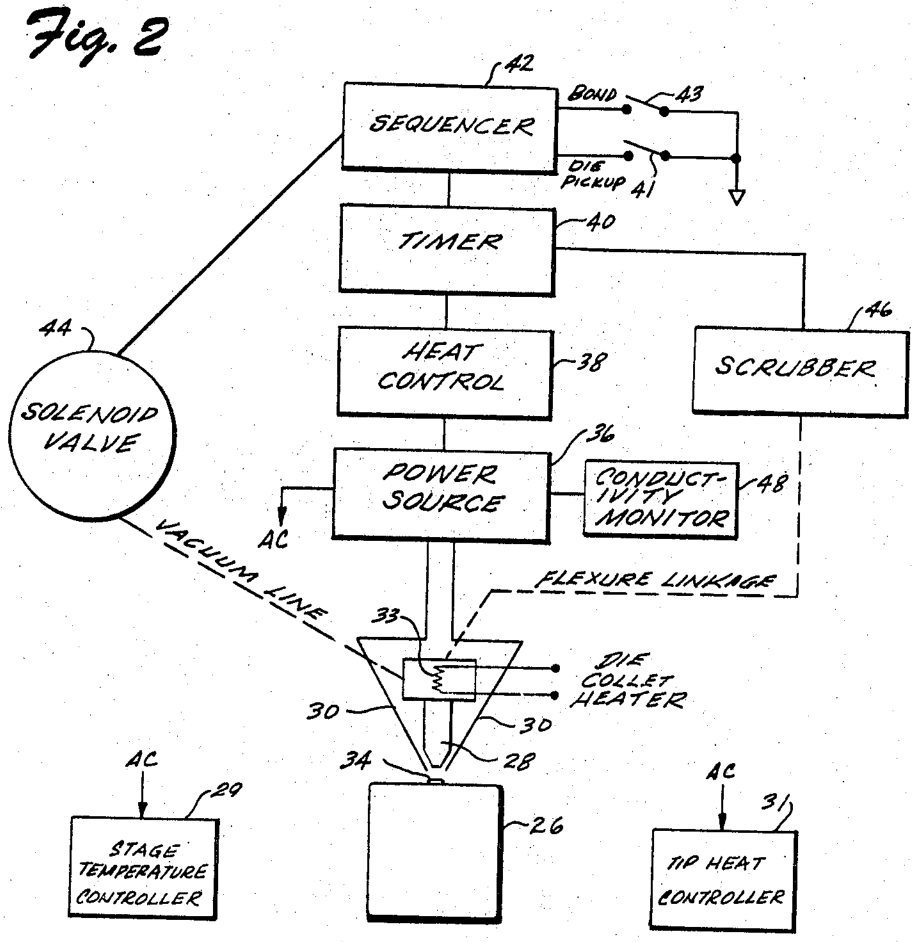
FIG. 2 is a block diagram of the apparatus of the present invention.

A block diagram shown in FIG. 2 further illustrates the basic components of the bonding tool of the present invention and their relationships. The pickup and bonding tool 28 is shown in position above the heater stage 26 in alignment with a die or chip 34 which has been affixed to a substrate held in position on the heater stage. The pair of heating electrodes 30 which bracket tool 28 are located and arranged so as to contact the substrate immediately adjacent two sides of the chip to achieve localized heating of the area to which the chip is attached. Electrical energy is applied to the heating electrodes 30 from a power source 36.

The amount of heating electric current supplied by the power source 36 to the heating electrodes is determined by a heat control 38 which is preset by the operator prior to apparatus operation. The heat control 38 is responsive to a timer 40 which is also preset by the operator and a sequencer 42, which contains the logic circuitry for control of the overall operation of the die bonder. The sequencer also includes a die pickup switch 41 and bond switch 43 mounted in operative relation to the guide assembly 50 (see FIG. 3). Sequencer 42 and switches 41, 43 provide output signals to a timer 40 and to a solenoid valve 44, providing the controls which actuate the solenoid valve to pick up dies or chips from surface 17 and deposit them on the substrate to which they are to be attached and which actuate the timer to initiate actual bonding. The timer 40 maintains the interval during which a pulse of heating current and scrubbing action are applied to substrate-chip combination. Timer 40 is connected to scrubber 46 which is mechanically connected by means of a flexure linkage 45 to the supporting arm 32 (FIG. 5) for bonding tool 28. A conductivity monitor 48 connected to the power source provides monitoring of the quality of the electrical contact of the heating electrodes 30 when the bonding tool is lowered into position with the chip in contact with the substrate. A signal from the conductivity monitor informs the operator that the electrodes are making a good electrical contact with the substrate as they come in contact with the gold plating thereon. In the preferred embodiment an audible signal is generated. Visual signals and an equipment interlock signal are also contemplated. Only after receiving the positive assurance of the signal from the conductivity monitor is the apparatus operation continued and bonding initiated. A stage temperature controller 29 connected to heater stage 26 provides an auxiliary source of heat to the substrate when needed for certain bonding applications. A tip heat controller 31 connected to a die collet heater 33 provides an auxiliary source of heat for the die collet 28 when needed.

Figure 3:
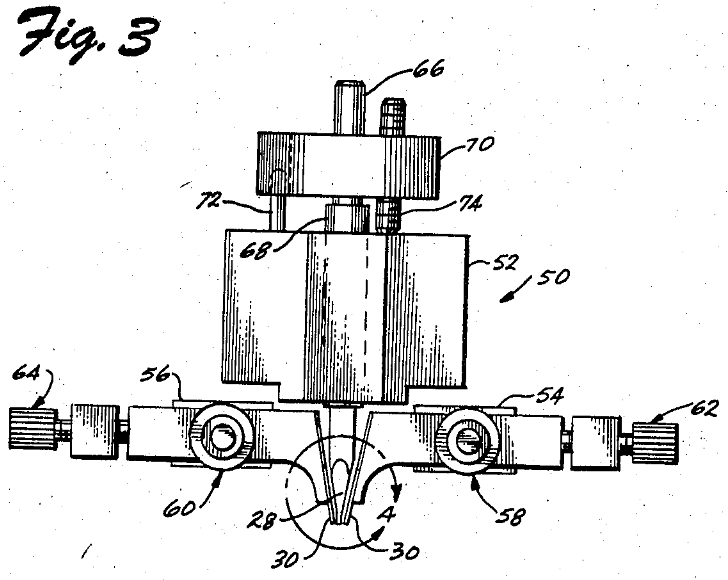
FIG. 3 is a front elevational view of a pickup and bonding tool and heating electrodes of the apparatus according to the present invention.

Details of the bonding arm assembly 22 are illustrated in FIG. 3. As shown therein, bonding tool 28 is mounted in a guide 52 by means of a "drop-in" slip-fitted arrangement. Located on each side of the pickup and bonding tool 28 are the heating electrodes 30. The first heating electrode is supported by an arm 54 and the second heating electrode by an arm 56. Allenhead screws 58 and 60 provide the means for securing the electrodes 30 to arms 54 and 56 respectively. Lateral adjustment of each of the heating electrodes for desired spacing relative to the pickup and bonding tool 28 is accomplished by biasing screws 62, 64. A cylindrical holder 66 for pickup and bonding tool 28 extends through guide 52. The pickup and bonding tool 28, holder 66, and weight 70 float in guide 52, i.e., when lowered into position for a pickup or bonding operation the bonding tool 28 is free to "ride" up and down within the guide 52. The proper orientation of tool 28 is assured by means of an anti-rotation pin 72, which keys and guides the tool into position. Weight 70 is a disc which is permanently secured to holder 66 and is selected so as to properly weight the bonding tool 28 and provide the desired amount of bonding force when the chip is brought to bear against the bonding location on the substrate. A set screw 74 provides means for adjusting the height of the pickup and bonding tool in the guide 52. The vertical movement of guide 52 is also utilized to trip microswitches 41, 43 of the sequencer, which are in turn connected through the sequencer logic circuitry to the solenoid valve and timer to provide the signals to these controls for initiating the pickup and bonding operations of the apparatus.

Figure 4:
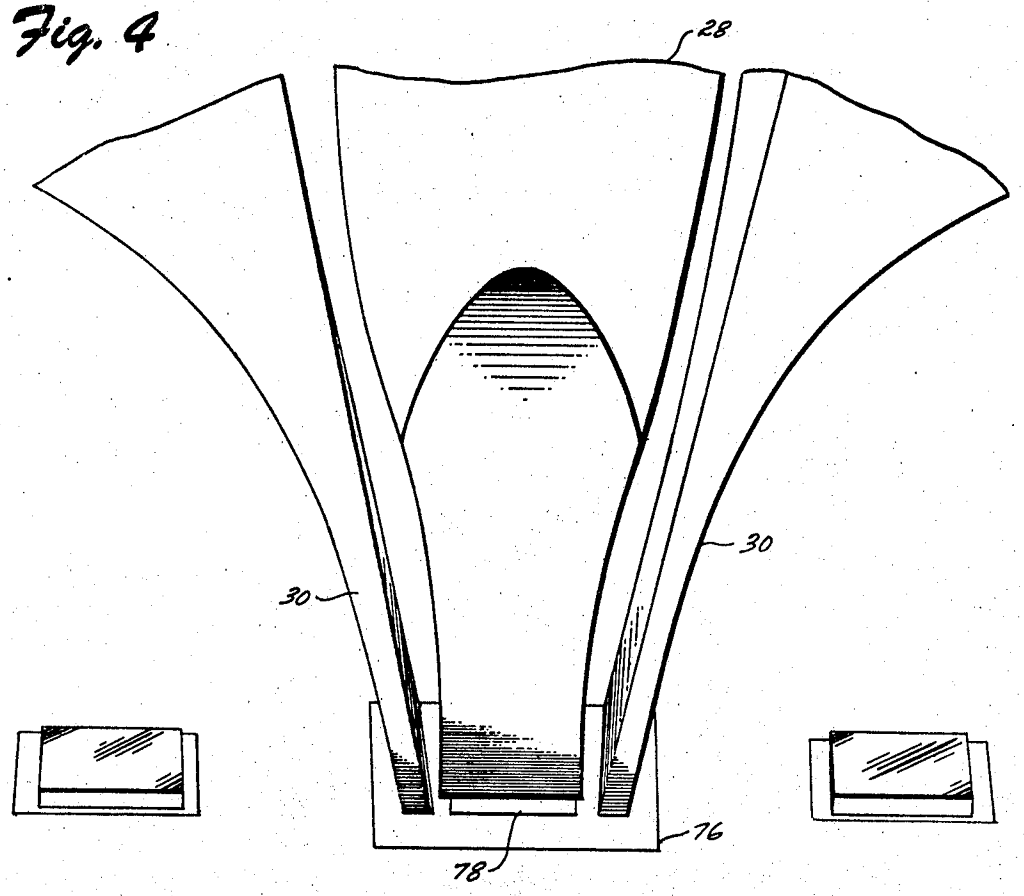
FIG. 4 is an enlarged view of the area designated 4 — 4 in FIG. 3.

Further details of the heating electrodes 30 and the pickup and bonding tool 28 relative to a chip 78 and localized area 76 on a substrate are illustrated in the expanded view of FIG. 4. As shown therein, a section 76 of gold metalized substrate to which it is desired to attach a die or chip 78 is brought into vertical alignment with the die collet 28 and the heating electrodes by suitable X - Y - $\theta$ movements by the operator of the pickup and heater stage assembly. Several types of die collets can be utilized with the apparatus of the present invention including tungsten collets having a chip retaining recess in the tip and ceramic collets having flat tips. Such tools all have a hollow longitudinal passage extending through them and opening into the tip for providing a conduit to communicate a partial vacuum source to pick up and hold an integrated circuit chip.

When in position, the bonding tool is lowered until electrodes 30 and chip 78 contact area 76. As shown, electrodes 30 are relatively wide and flat in configuration to provide a uniform current density through substrate section 76 for evenly distributed heating of the entire area to which the chip is attached. The use of flat electrodes prevents "hot spots" and non-uniform current densities which occur if point electrodes are used. When the electrodes 30 make satisfactory electrical contact with the gold plating on area 76, an audible signal is generated by the conductivity monitor. As the guide is lowered further, the bond switch and the sequencer are actuated, causing, for a predetermined amount of time, a heating current pulse to be supplied to heating electrodes 30 and a linear, back and forth scrubbing motion to be imparted to the bonding tool. The simultaneous application of heat and scrubbing action produces a eutectic bond of chip 78 to substrate 76. Provision of localized heating of the substrate by means of heating electrodes 30 permits significant reductions in the general temperatures at the bond site (up to 200° C reduction), greatly reducing the possibility of heat damage to chip or substrate while at the same time assuring reliable, secure eutectic bonds.

Figure 5:
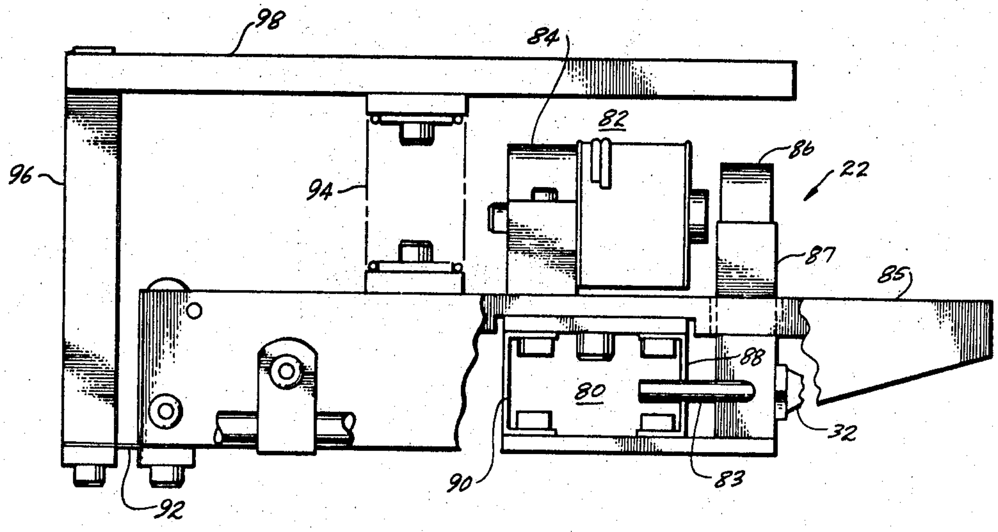
FIG. 5 is a side elevational view of a bonding arm assembly of the apparatus.

The bonding arm assembly 22 is illustrated in further detail in the side elevational view of FIG. 5. This view illustrates the flexure linkage supporting the bonding arm 32 and the various components of the electromagnetic vibrating assembly which are utilized to produce the scrubbing action of the bonder. The bonding assembly is held in position by a parallelogram flexure assembly 80. The electromagnetic vibrating assembly 82 comprising a solenoid 84 and permanent magnet 86 is located above assembly 80. Solenoid 84 is mounted on and secured to frame member 85. Magnet 86 is mounted on support 87 which extends through frame member 85 and is secured to flexure assembly 80. A conduit 83 extends from the side of support 87. Conduit 83 communicates with a conduit in arm 32 and thence to the tip for providing the vacuum pickup force for the chip. Alternating voltage supplied to solenoid 84 causes attraction and repulsion of magnet 86, producing linear vibrations about a single fixed point. Such vibrations are in turn imparted to the bonding tool by deflection of flexures 88 and 90 of the flexure assembly 80 in a vertical plane. The vertical deflection of the bonding arm assembly is supported by a flexure 92 and coil spring 94. Flexure 92 deflects in a horizontal plane as the bonding tool is brought into contact with the pickup stage and again with the bonding stage. A flexure holder 96 and a frame member 98 of the apparatus complete the assembly.

The parallelogram flexure assembly 80 provides a means for imparting linear vibrations to the bonding tool which is rigid in the transverse direction. The amplitude of motion is controlled by increasing or decreasing the voltage applied to the solenoid. Since the motion of the assembly is about a fixed point to which the assembly returns after removal of voltage from the solenoid, positioning accuracy is maintained. Typically, conventional line frequency voltage is supplied, producing 60Hz vibrations of the tool. Other AC frequencies as well as DC pulses of various amplitudes and frequencies are also contemplated for specific bonding applications.

Figure 6:
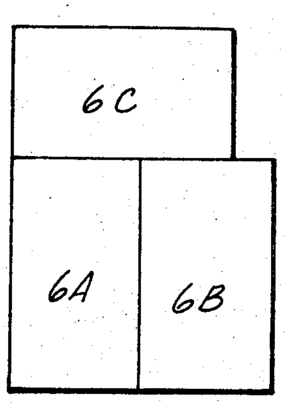
FIG. 6 illustrates the relationship of the schematic diagram of FIGS. 6A through 6C.
Figure 6A:
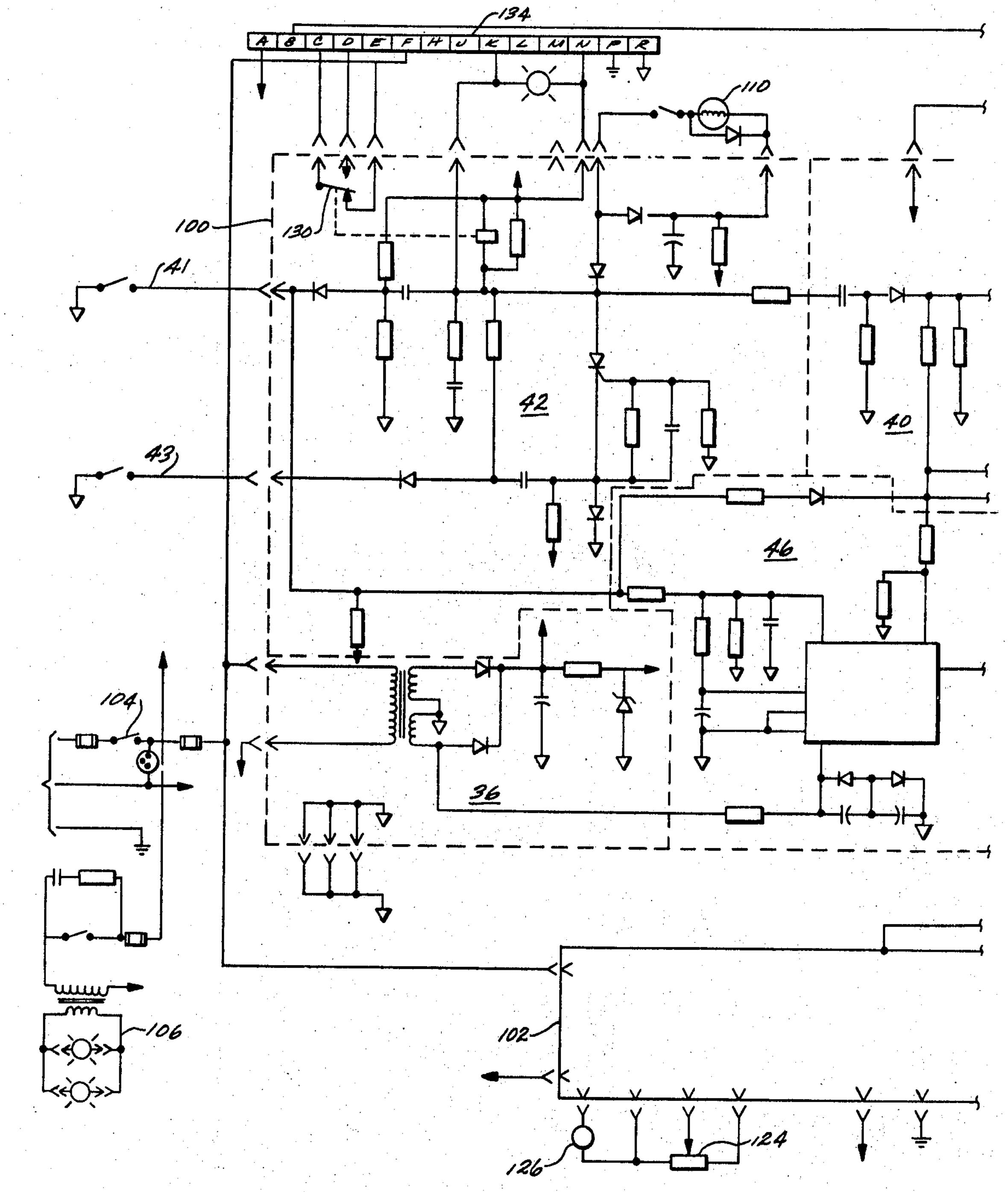
FIGS. 6A through 6C are schematic diagrams of separate portions of the electrical circuitry of the apparatus of the present invention.
Figure 6B:
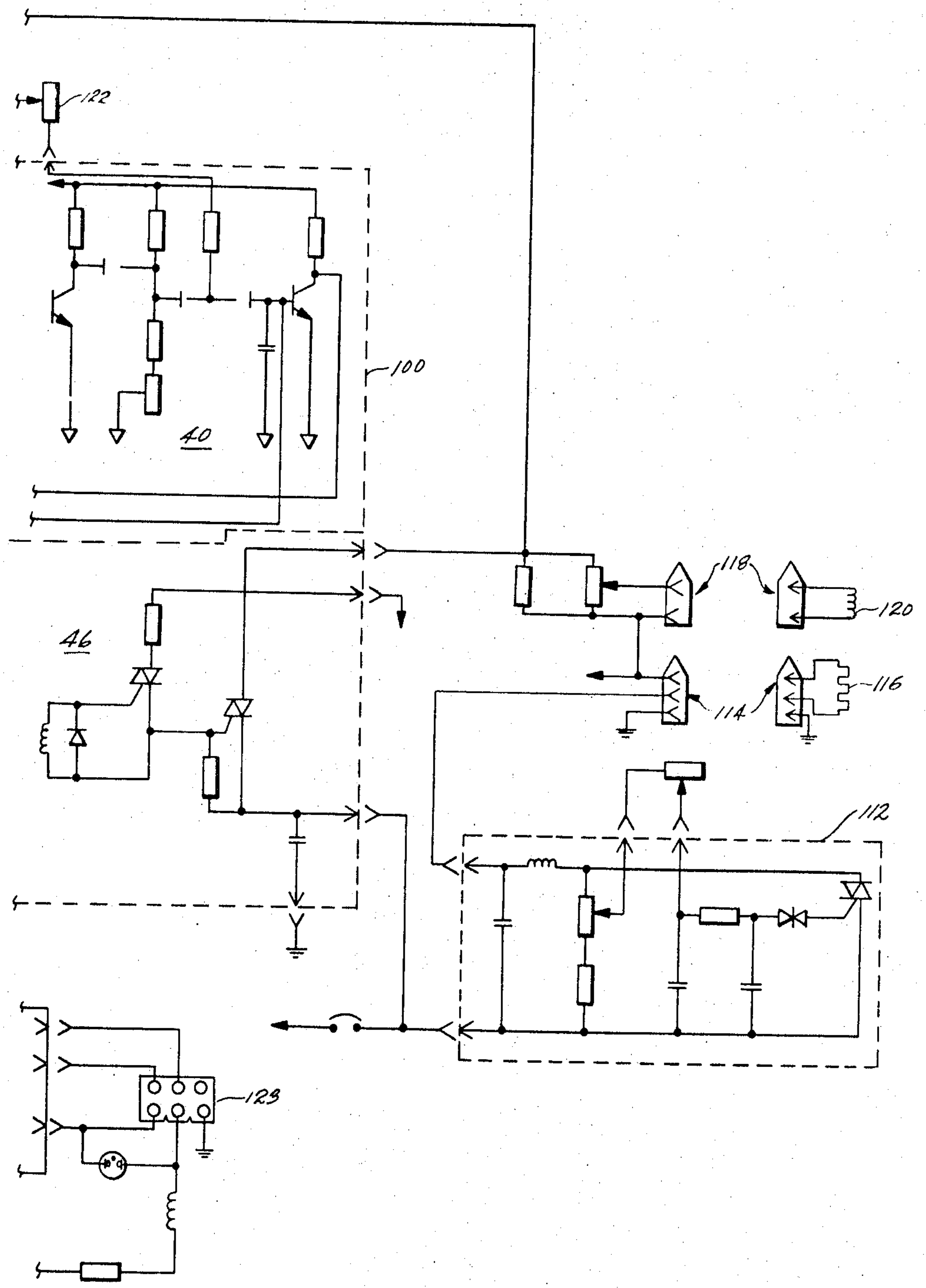
Figure 6C:
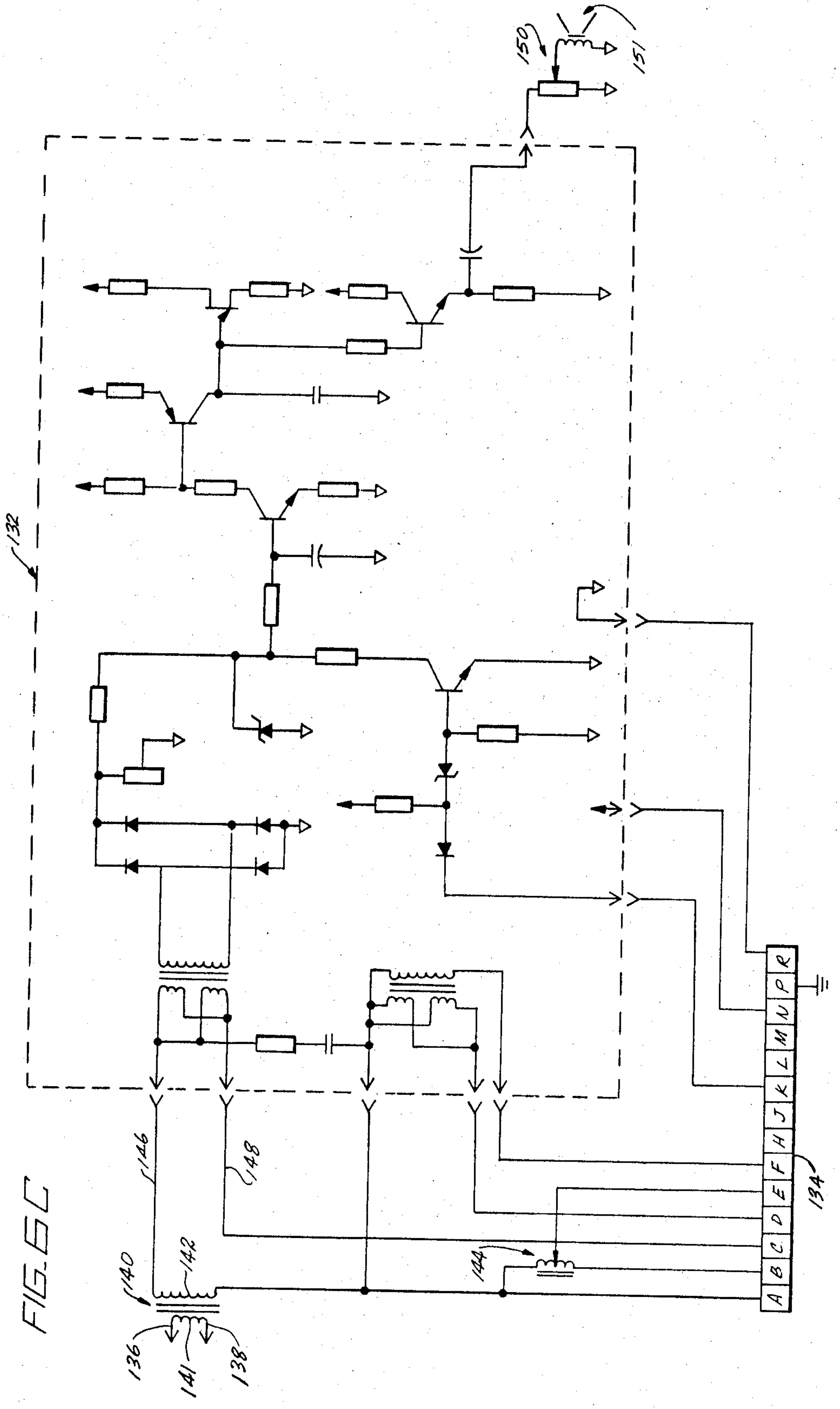

The schematic diagram illustrating the electrical circuitry of the apparatus of the present invention is provided in FIGS. 6A, 6B, and 6C. The interrelationship of the circuitry shown in these three figures of the drawing is obtained by reference to FIG. 6, a diagrammatic illustration of the proper orientation of the three figures of the schematic diagram.

The schematic diagram provided in FIGS. 6A and B illustrates the circuitry utilized with the die bonder according to the present invention. The circuitry shown within dashed enclosure 100 corresponds to sequencer 42, timer 40 and power source 36 of the block diagram of FIG. 2. The temperature control circuitry for controlling the heater stage temperature is included within the enclosure 102. The main power switch 104 for the apparatus is connected to normal line supply voltage and supplies power to the entire unit. Light sources 106 for the illumination of the pickup and bonding stages are connected into the circuitry on the apparatus side of power switch 104. A vacuum solenoid is connected to the sequencer 42 for operation responsive to signals therefrom. As shown in FIG. 6B, the circuitry for controlling the power to the tip heater is included within dotted enclosure 112. The output of the heater circuitry is supplied through connector 114 to a resistor 116 which comprises the tip heater. A plug-in connector 118 likewise provides the means whereby the scrubber solenoid 120 is connected to the control circuitry. The scrub time potentiometer is shown at 122. The heater 123 for the heating stage is shown connected to temperature control circuitry 102. The amount of heat supplied to the heating stage is controlled by potentiometer 124. A thermocouple is included in stage heater 123 and in conjunction with a meter 126 monitors the actual temperature of the bonding stage. Die pickup 41 and bond switch 43 are connected to the logic circuitry of the sequencer 42 as shown. Microswitch 41 controls the operation of the vacuum solenoid, causing the connection of a vacuum source to the pickup and bonding tool to pick up and release a chip from the pickup stage and to deposit same on the bonding stage. Switch 43 actuates the sequencer to initiate the bonding operation when the bonding tool has deposited the chip at the substrate location to which it is to be bonded.

The schematic diagram provided in FIG. 6C illustrates the power supply and conductivity monitor portions of the circuitry of the present invention. Included therein within dotted enclosure 132 (corresponding to a printed circuit board) is the circuitry corresponding to conductivity monitor 48 of FIG. 2. The circuitry of FIG. 6 is interconnected to the sequencing circuitry of FIG. 6A by means of connector 134. The connection of the power supply to the heating electrodes is accomplished by means of leads 136, 138 connected to the secondary winding 141 of the transformer 140. The primary winding 142 of transformer 140 is connected to the AC power source through connector 134 and variac 144. Adjustment of variac 144 by the operator controls the amplitude of the heating pulse supplied over leads 136, 138 to heating electrodes 30. The conductivity monitor circuitry 132 is likewise connected to the primary winding 142 of the transformer 140 by means of leads 146, 148. Potentiometer 150 provided at the output of the conductivity monitor controls the output volume of the audible signal from speaker 151 utilized to indicate the establishment of satisfactory electrical contact between the heating electrodes and the substrate to be heated.

Figure 7:
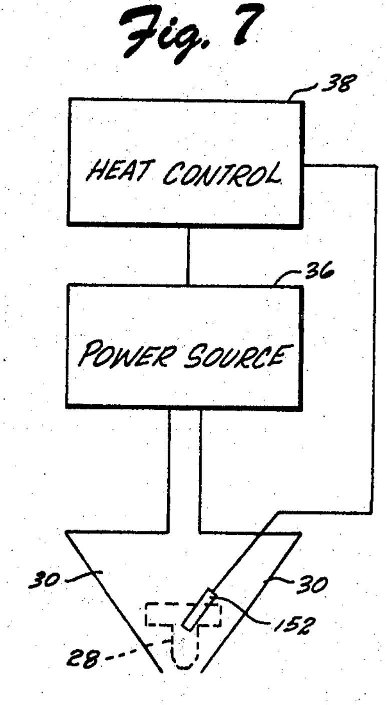
FIG. 7 is a diagram of an alternate embodiment of the temperature control portion of the apparatus.

An alternate embodiment of the portion of the block diagram of FIG. 2 is shown in FIG. 7, illustrating the use of a sensor to determine the temperature at the bonding location. As shown in FIG. 7, an infrared detector 152 is disposed adjacent bonding tool 28 and heating electrodes 30 and is directed at the bonding location so as to "view" the temperature at the bonding site to provide a feedback signal to heat control 38. Heat control 38 in turn provides a control signal to power source 36, increasing or decreasing the amount of electrical current supplied to heating electrodes 30 in the heating pulse source to maintain even and precise control of the temperature conditions at the bonding location.

The operation of the bonder according to the present invention is one which utilizes the principal of pulsed substrate heating pulse a 60-hertz scrubber which operates simultaneously to accomplish bonding. In operation, the air bearing is actuated and the pickup and bonding stage manipulator moved into alignment with the pickup and bonding tool. Actuation of a control causes the pickup tool to move down and contact the selected die. During the downward movement, after contact of the die collet with the die, switch 41 is activated, causing vacuum to be applied to ready the die for pickup. The pickup and bonding tool supporting arm 32 then returns to the rest position and remains there holding the die at the end of the die collet. The pickup and bonding stage manipulator is again activated to energize the air bearing and the substrate moved into alignment under the die. The bonder control is again actuated, causing the bonding arm to be lowered and heating electrodes to contact the metalization on the substrate. Contact of the heating electrodes causes the generation of the audible signal by the conductivity monitor if electrical contact is established, the circuit being completed through relay 130 in the sequencer logic circuitry. As the bonding arm is lowered further, microswitch 43 is activated, relay 130 is switched, and a signal is caused to be generated by the sequencer. The signal from the sequencer initiates the timer which in turn actuates the scrubber. Relay 130 now connects variac 144 into the circuit and the substrate heating current pulse is generated simultaneously with the scrubbing action for a predetermined amount of time as set on the controls of the bonder.

What is claimed is:

1. A pulse heated eutectic bonding apparatus for attaching semiconductor dies to a metalized substrate of material comprising:
- a housing;
- a die pickup and bonding tool;
- a bonding arm connected to and supported by the housing;
- a holder for the tool supported by the bonding arm;
- electrode means supported by the bonding arm adjacent the bonding tool for selectively contacting and supplying heating current to the substrate area at the die attachment location during the interval of contact of the bonding tool with the substrate area;
- electric power supply means;
- means interconnecting the power supply and the electrodes for supplying an electric current heating pulse to the electrode means during the bonding interval to raise the substrate area to a eutectic bonding temperature;
- electromagnetic vibrating means coupled between the bonding arm and the holder for vibrating the tool at a predetermined frequency during the heating of the substrate; and
- control means for producing the heating pulse and vibration simultaneously for a predetermined length of time.

2. A bonding apparatus according to claim 1 including monitoring means electrically coupled to the electrode means for sensing electrical contact between the substrate and the electrode means.

3. A bonding apparatus according to claim 2 including a flexure linkage coupling the vibrating means between the bonding arm and the holder, the flexure linkage being deflectable in the direction of the vibrating action and rigid in the direction transverse to the vibrating action.

4. A bonding apparatus according to claim 3 wherein the flexure linkage includes a pair of flexures vertically oriented in a parallelogram configuration for transmitting horizontal vibrations to the holder and tool.

5. A bonding apparatus according to claim 4 wherein the electromagnetic vibrating means includes a permanent magnet secured to the holder and a solenoid secured to a frame member of the apparatus in operative relation with the magnet.

6. A bonding apparatus according to claim 5 including means for controlling the amplitude and frequency of an excitation signal applied to the solenoid for controlling the amplitude and frequency of motion of the magnet and vibration of the tool.

7. A bonding apparatus according to claim 6 wherein the electrode means include a first and second electrode supported by the bonding arm and located on opposite sides of the tool, the electrodes having at least one extended dimension for producing an evenly distributed electric current density in the substrate beneath the die.

8. A bonding apparatus according to claim 7 wherein the pickup and bonding tool is retained in a slip fit mounting in the holder for floating action during bonding and easy insertion and removal from the holder.

9. A bonding apparatus according to claim 8 wherein the bonding tool includes a weight secured thereto for applying a predetermined amount of bonding force to the die during bonding.

10. A bonding apparatus according to claim 9 including a die pickup stage for storing dies to be bonded and a bonding stage for holding the substrate in position supported by the apparatus housing, the two stages being movable relative to the tool to permit selective location of the die pickup stage or substrate stage in precise alignment with the bonding tool.

11. A bonding apparatus according to claim 10 wherein the pickup stage and bonding stage are supported on a common manipulator platform mounted on the apparatus housing.

12. A bonding apparatus according to claim 11 including selectively applied air bearing means for slidably supporting the manipulator platform on the bonding apparatus.

13. A bonding apparatus according to claim 12 including means for heating the pickup and bonding tool.

14. A bonding apparatus according to claim 13 including auxiliary heating means for heating the bonding stage.

* * * * *